(12) United States Patent
Scopelitis

(10) Patent No.: US 9,686,972 B2
(45) Date of Patent: Jun. 27, 2017

(54) FISHING FLOAT AND METHOD

(71) Applicant: Edward G. Scopelitis, Mount Pleasant, SC (US)

(72) Inventor: Edward G. Scopelitis, Mount Pleasant, SC (US)

( * ) Notice: Subject to any disclaimer, the term of this patent is extended or adjusted under 35 U.S.C. 154(b) by 146 days.

(21) Appl. No.: 13/785,627

(22) Filed: Mar. 5, 2013

(65) Prior Publication Data
US 2014/0250764 A1  Sep. 11, 2014

(51) Int. Cl.
*A01K 93/00* (2006.01)

(52) U.S. Cl.
CPC .................... *A01K 93/00* (2013.01)

(58) Field of Classification Search
CPC ......... A01K 93/00; A01K 95/00; A01K 95/02
USPC ............. 43/44.87, 44.9, 44.91, 44.89, 44.92, 43/44.93, 44.95
See application file for complete search history.

(56) References Cited

U.S. PATENT DOCUMENTS

| | | | | |
|---|---|---|---|---|
| 987,522 | A * | 3/1911 | Williams | A01K 93/00 43/44.91 |
| 2,504,241 | A * | 4/1950 | Wulff | A01K 93/00 43/44.87 |
| 2,787,079 | A * | 4/1957 | Wilson | 43/44.87 |
| 2,849,827 | A * | 9/1958 | Gardiner | A01K 93/00 43/43.14 |
| 2,965,999 | A * | 12/1960 | Marsh | A01K 93/00 43/44.87 |
| 3,195,262 | A * | 7/1965 | Metzler | A01K 95/00 43/43.12 |
| 3,589,052 | A * | 6/1971 | King | A01K 95/00 24/116 A |
| 4,109,404 | A | 8/1978 | Preeschl | |
| 4,251,941 | A * | 2/1981 | Howard | 43/43.11 |
| 4,351,128 | A | 9/1982 | Sivertsen | |
| 4,361,978 | A * | 12/1982 | Kane | A01K 93/00 43/44.87 |
| 4,486,969 | A | 12/1984 | Swenson | |
| 4,506,471 | A * | 3/1985 | Riead | A01K 93/00 43/44.87 |
| 4,563,831 | A | 1/1986 | Gibney | |
| 4,782,537 | A * | 11/1988 | Kinslow | E03D 1/14 137/426 |
| 4,809,456 | A | 3/1989 | Caparelli, Jr. et al. | |
| 4,823,497 | A | 4/1989 | Pierce, Jr. et al. | |
| 4,916,846 | A | 4/1990 | Pehm | |
| 5,199,205 | A | 4/1993 | Klammer | |

(Continued)

*Primary Examiner* — Thien Thanh Pham
(74) *Attorney, Agent, or Firm* — Southeast IP Group, LLC.; Thomas L. Moses

(57) ABSTRACT

An adjustable fishing float having a novel securing mechanism for attaching the float to a fishing line. In a preferred embodiment, the fishing float includes a housing formed into a spherical shape. A vertical slot is disposed on a side of the housing, extending inwardly to a central, vertical axis of the sphere. A securing mechanism may be disposed within the housing, and provides a spring biased clamp that is in operative communication with the slot, so that a fishing line may be positioned within the slot and the float may be clamped to the fishing line in a desired position. A button on the side of the housing may be used to open the clamp, in order to affix the float to the line, remove the float from the line, or to adjust the float and move it upwardly or downwardly along the fishing line.

4 Claims, 8 Drawing Sheets

(56) References Cited

U.S. PATENT DOCUMENTS

| | | | |
|---|---|---|---|
| 5,345,657 A * | 9/1994 | Shimizu | F16G 11/10 24/115 G |
| 5,457,909 A * | 10/1995 | Graves | A01K 95/00 43/44.91 |
| 5,758,449 A | 6/1998 | Munsterman et al. | |
| 5,890,315 A | 4/1999 | Norton | |
| 5,974,721 A | 11/1999 | Johnson et al. | |
| 5,987,802 A | 11/1999 | Caprio | |
| 5,987,807 A * | 11/1999 | Reed | 43/44.87 |
| 6,026,608 A | 2/2000 | Grimes | |
| 6,301,822 B1 | 10/2001 | Zernov | |
| 6,493,981 B2 | 12/2002 | Izzard | |
| 6,776,502 B2 | 8/2004 | Hung | |
| 7,866,085 B1 * | 1/2011 | Ruzicka | A01K 85/00 43/43.1 |
| 2004/0031188 A1 | 2/2004 | Dugger | |
| 2005/0011109 A1 | 1/2005 | Valentyne | |
| 2005/0279010 A1 | 12/2005 | Krog | |
| 2008/0066366 A1 | 3/2008 | Todd | |
| 2008/0098574 A1 | 5/2008 | Kim | |
| 2008/0256760 A1 | 10/2008 | Kavanaugh | |
| 2008/0256840 A1 * | 10/2008 | Rodriguez | A01K 93/00 43/42.31 |
| 2008/0282599 A1 | 11/2008 | Kavanaugh | |
| 2009/0077858 A1 | 3/2009 | Wright et al. | |
| 2009/0188151 A1 | 7/2009 | Bartholonew | |
| 2010/0031554 A1 | 2/2010 | Brooks, Jr. et al. | |
| 2011/0056116 A1 | 3/2011 | Kavanaugh | |
| 2011/0225872 A1 | 9/2011 | Farley et al. | |
| 2011/0283596 A1 * | 11/2011 | Robinson | A01K 97/01 43/44.92 |
| 2012/0005867 A1 | 1/2012 | Whaley | |
| 2012/0180375 A1 * | 7/2012 | Kavanaugh | A01K 93/00 43/43.1 |

\* cited by examiner

FISHING FLOAT AND METHOD

BACKGROUND OF THE INVENTION

The present invention relates generally to fishing floats, commonly called bobbers, which are attached to a fishing line, and typically serve dual purposes: 1) to maintain the hook and bait at a pre-determined, constant depth, and 2) to alert the fisherman that a fish has taken the bait. More specifically, the present invention is directed to a novel fishing float and method, wherein the fishing float includes a simple and effective means for attachment to a fishing line that represents a dramatic improvement over previous fishing float attachment mechanisms.

The use of fishing floats or bobbers is likely as old as the act of fishing itself. Many different types of devices have been developed and used to alert a fisherman that a fish is on the hook, and a bobber is a very simple tool that serves the purpose well. A fisherman simply baits the hook, and then attaches the bobber some small distance above the hook and bait. The bobber keeps the bait suspended at a desired depth below the surface (thus preventing the bait from dragging along the bottom, if desired), and when the bobber disappears under the surface of the water, the fisherman knows that something has taken his bait. In its simplest form, a bobber was simply a buoyant object attached to a fishing line. More recently, bobbers have become more sophisticated, with additional features, such as internal lights, oftentimes used for night fishing. However, one area that has not improved significantly in recent years is the method of attachment to a fishing line, which has traditionally been time-consuming and awkward.

Examples of fishing floats, bobbers and sinkers having attachment means to a fishing line include the following: U.S. patent application Ser. No. 12/876,386 discloses fishing line stops including a lid and main body. The lid has inner and outer walls, wherein the lid outer wall forms a portion of an outer surface of the fishing line stop. The lid inner wall has first and second surfaces, which are separated from each other by a lid offset that runs perpendicular to a central longitudinal axis. The main body has inner and outer walls. The main body inner wall forms another portion of the outer surface of the fishing line stop. The main body inner wall has first and second surfaces, which are separated from each other by a main body offset that runs perpendicular to the central longitudinal axis.

U.S. patent application Ser. No. 10/223,896 is directed to an apparatus that is attachable to a fishing line between the fishing reel and the hook. The apparatus makes it easier for an angler to jig the bait and set the hook because the user may manipulate their lure or bait without having to move sinkers through the water. One embodiment of the invention comprises a shell having a first half attached to a second half with a hinge and fastening means. The first half has a first interior wall and the second half has a second interior wall. The shell has openings for passing fishing line into and out of the shell. A first axle is attached to the first interior wall. A pulley is rotatably mounted on the first axle, where the pulley has a peripheral surface adapted for engaging the fishing line. A second axle is attached to the first interior wall adjacent to the pulley, where an idler wheel is rotatably mounted on the second axle. The idler wheel engages the peripheral surface of the pulley. Spring means engage the pulley, in which the spring means are placed in a tightened position when the pulley is rotated in a first direction. However, the spring means are not tightened when the pulley is rotated in a direction opposite to the first direction. Guiding means guide the fishing line through the shell to the pulley.

U.S. patent application Ser. No. 13/122,429 is directed to a sinker or float that releasably clamps around a line, such as a fishing line, including two members shaped to define a channel for the line when in a closed position. A locking means is provided to releasably lock the two members in the closed position. Each of the members has at least a portion of high or low density material to provide a sinking or floating effect. A jacket may be provided that retains the high or low density material therein. The jacket may also include a hinge portion such that the two members can be hingedly opened and closed.

U.S. Pat. No. 4,563,831 discloses a fishing float having a buoyant body with a spherical or ellipsoidal shape. A slot is provided essentially half way through the body of the float to a central axis thereof having a line securing hook disposed at each end of the slot. When the float is placed on a fish line, the line is inserted into the slot, snapped into the hooks and aligned with the central axis of the float. A plurality of ridges in the slot maintain tension of the line to prevent slippage. The float may be moved along the fish line with slight force. The hooks prevent dislodgement of the float from striking of objects or from getting caught in weeds or the like during use.

BRIEF SUMMARY OF THE INVENTION

In accordance with one aspect of the invention, a fishing float having a simple, novel means for attachment to a fishing line is provided. In a preferred embodiment, the fishing float is formed into the shape of a sphere, although other shapes may be employed, as desired. The fishing float, in one embodiment, includes a pair of hemispheres: a top hemisphere and a bottom hemisphere, which are attached together to form the spherical float. A vertical slot is positioned on one side of the float, and extends inwardly to a central vertical axis of the sphere.

A spring loaded securing mechanism for securing the float to a fishing line is housed within the float, so that the fishing line may be placed within the slot and the spring loaded securing mechanism clamps and applies pressure to the fishing line. The securing mechanism includes a fixed member and a slidable member disposed in interlocking relation, wherein a clamp is formed between a face of the slidable member and a face of the fixed member. A series of springs are disposed between the fixed member and the slidable member, in order to bias the clamp toward a closed position. The slidable member includes a button protruding outwardly therefrom, which extends through a hole in the side of the float. Thus, in use, a user pushes the button on the side of the float, which forces the slidable member against the springs and opens the clamp, and then slides the float onto the fishing line through the slot, until the fishing line is positioned axially through a central portion of the float. Then, when the button is released, the clamp secures the float to the fishing line in the desired location. In order to adjust the float upwardly or downwardly along the fishing line, the user may simply press the button and slide the float in the desired direction, releasing the button when the float is in the desired, adjusted position.

It is further contemplated that the float may have internal compartments for housing a removable rattle and/or a glow light.

BRIEF DESCRIPTION OF THE DRAWINGS

These and other features, aspects, and advantages of the present invention will become better understood with regard to the following description, appended claims, and accompanying drawings where:

DETAILED DESCRIPTION OF THE INVENTION

Figure 1:
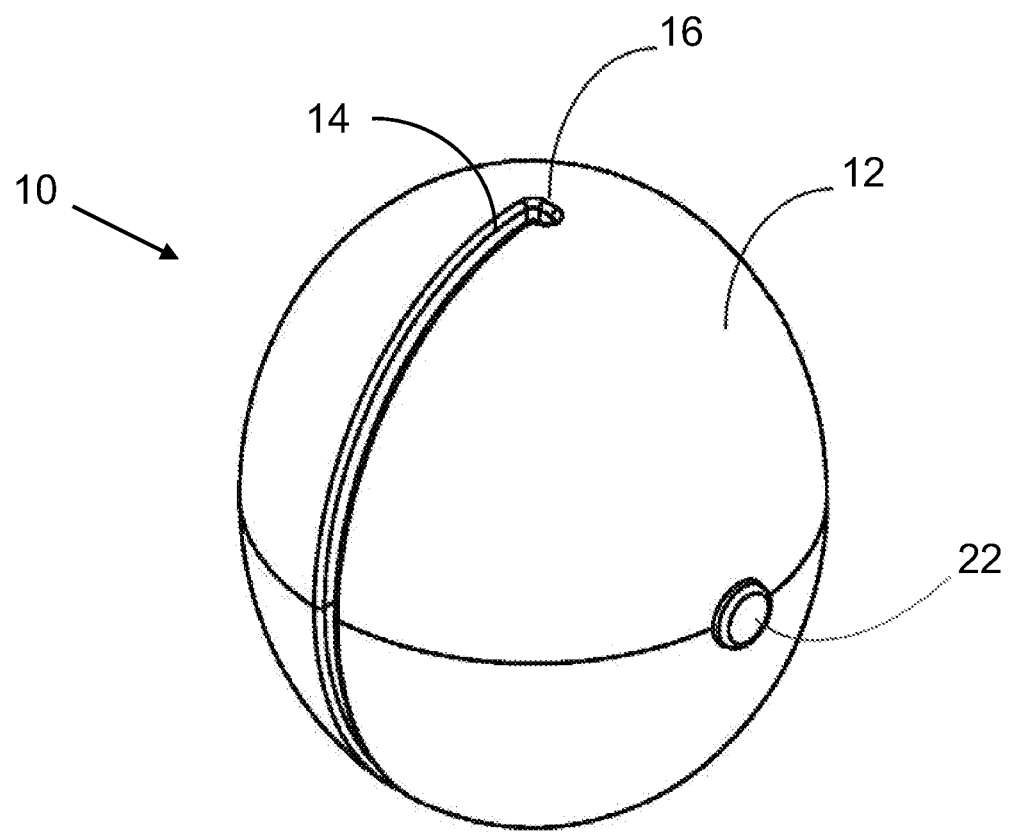
FIG. 1 is a perspective view of one embodiment of a fishing float in accordance with one aspect of the present invention.
Figure 2:
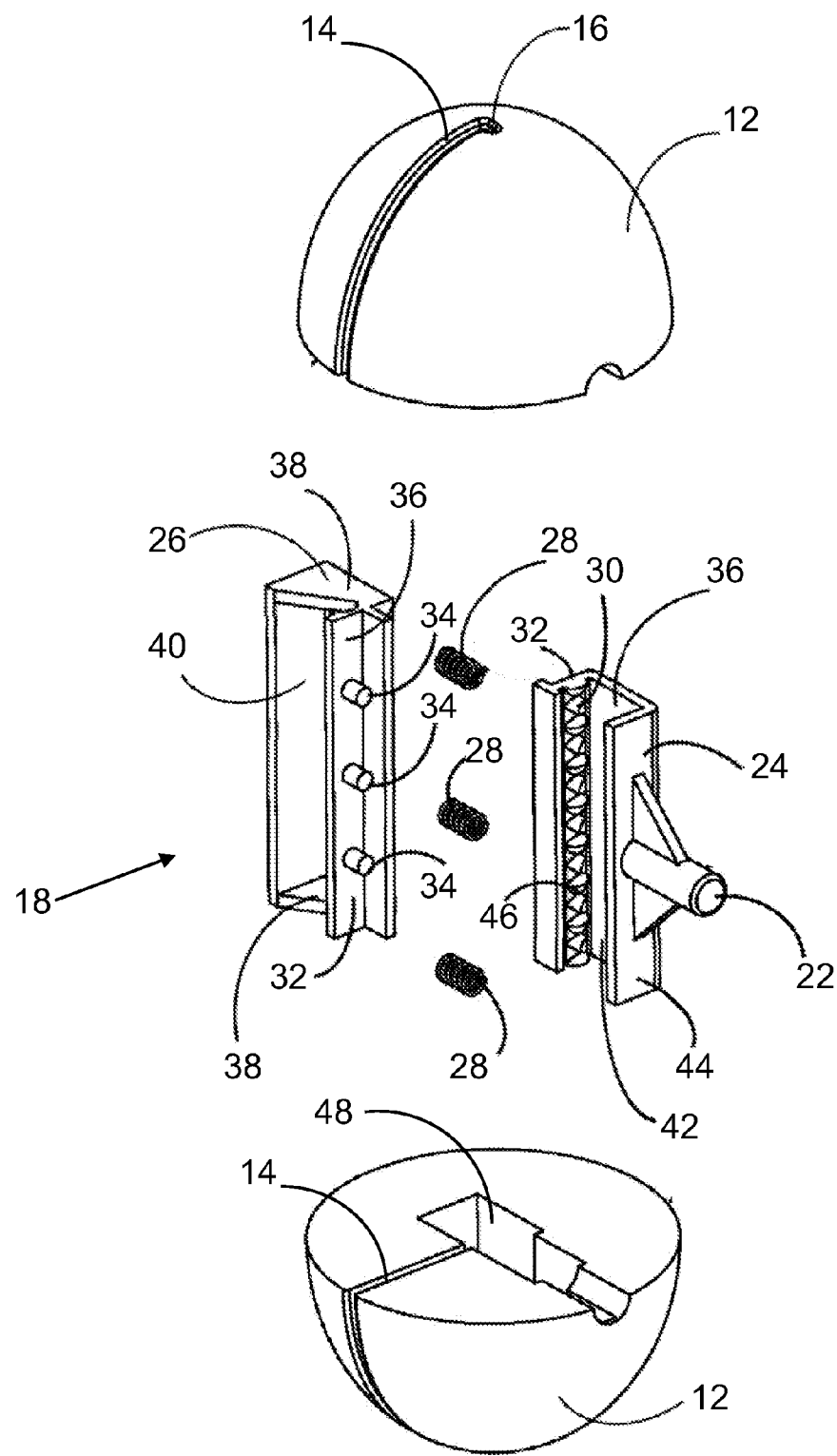
FIG. 2 is an exploded view of one embodiment of a fishing float in accordance with one aspect of the present invention.
Figure 3:
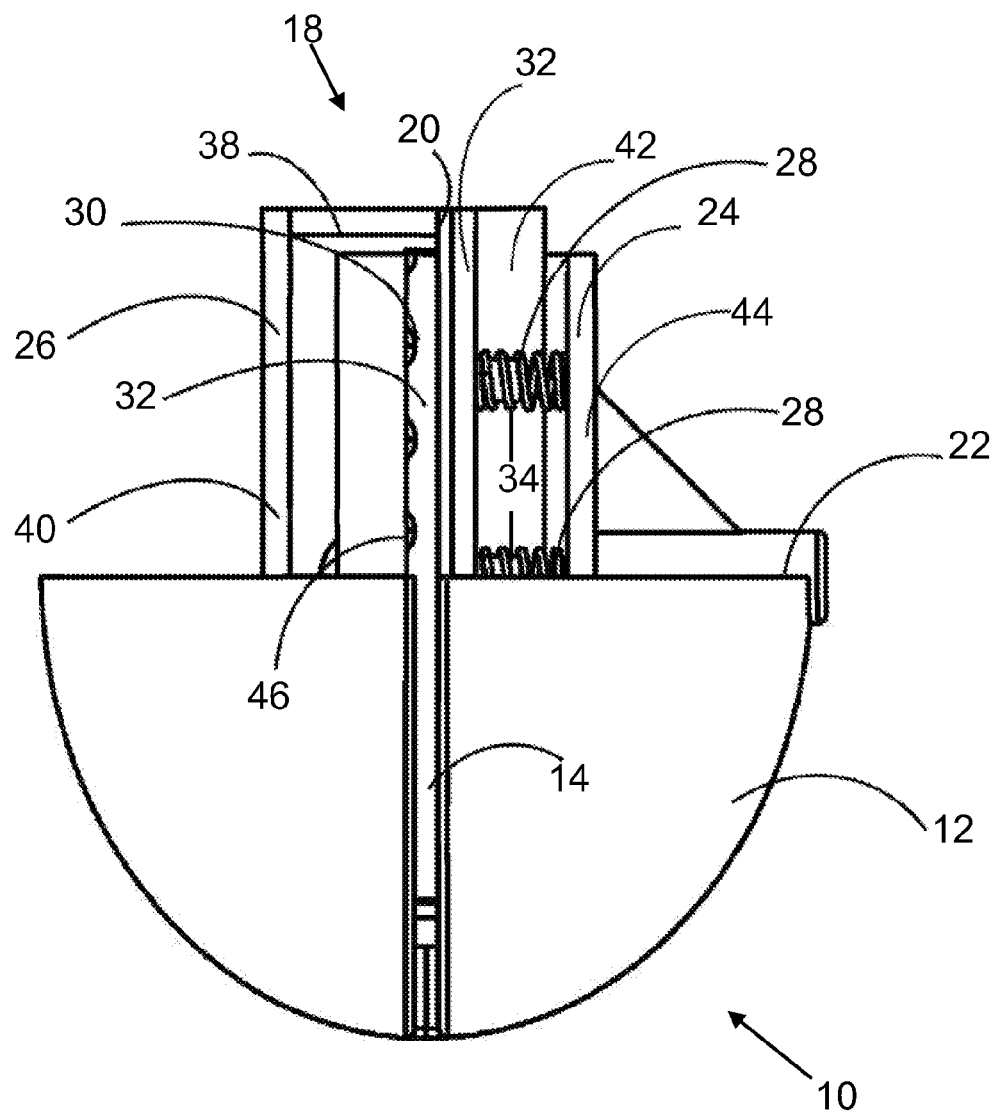
FIG. 3 is a side view of one embodiment of a fishing float in accordance with one aspect of the present invention, wherein a bottom hemisphere is shown without a top hemisphere of the float, and the securing mechanism is shown.

The present invention includes an adjustable fishing float having a novel securing mechanism 18 for attaching the float to a fishing line. In a preferred embodiment, the fishing float includes a housing 12 formed into a spherical shape, having a top hemisphere attached to a bottom hemisphere. A vertical slot 14 is disposed on a side of the housing, extending inwardly to a central, vertical axis of the sphere. In one embodiment, the slot may have a small angular notch 16 along or adjacent the central vertical axis, so that the fishing line may be slid inwardly toward the central axis, and then may be slid angularly (preferably a generally right angle) into the notch 16 for securing purposes.

A securing mechanism 18 may be disposed within the housing 12, as shown, and provides a spring biased clamp 20 that is in operative communication with the slot 14, so that a fishing line may be positioned within the slot 14 and the float 10 may be clamped to the fishing line in a desired position. A button 22 on the side of the housing 12 may be used to open the clamp 20, in order to affix the float 10 to the line, remove the float 10 from the line, or to adjust the float 10 and move it upwardly or downwardly along the fishing line.

The securing mechanism 18 includes three component parts, in a preferred embodiment: a slidable member 24, a fixed member 26, and a series of springs 28 interposed between the slidable member 24 and the fixed member 26. The slidable member 24 is operatively connected to the fixed member 26 in interlocking relation. Both the slidable member 24 and the fixed member 26 include a clamp face 30, and the springs 28 are used to bias the clamp faces 30 into a closed position. The slidable member 24 preferably includes a protruding button 22 that extends outwardly through a hole or opening in the housing 12, although it is possible to provide a button that is flush with the housing 12 of the float 10. In use, the button 22 may be pressed, which opens the clamp 20 within the float 10 and allows a fishing line to be passed through the slot 14 and into the clamp 20 between the clamp faces 30. When the button 22 is released, the clamp 20 closes onto the fishing line, and the float 10 is secured to the line. It is also contemplated that other types of clamping mechanisms may be used that do not include spring members, but use other means to apply pressure to the fishing line in order to secure the float thereto.

Figure 4:
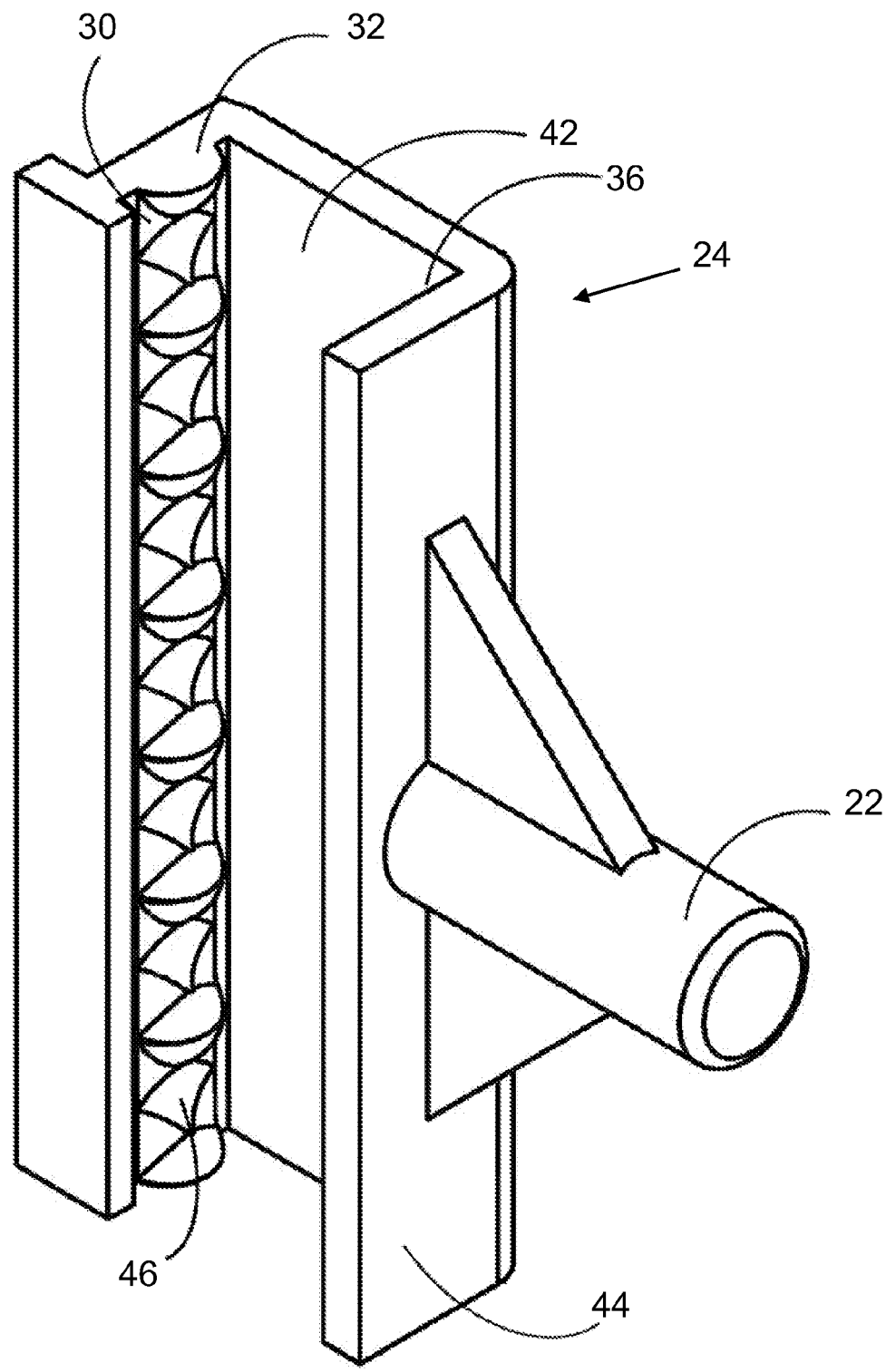
FIG. 4 is a perspective view of one embodiment of the slidable member of the securing mechanism for attaching the float to a fishing line.
Figure 5:
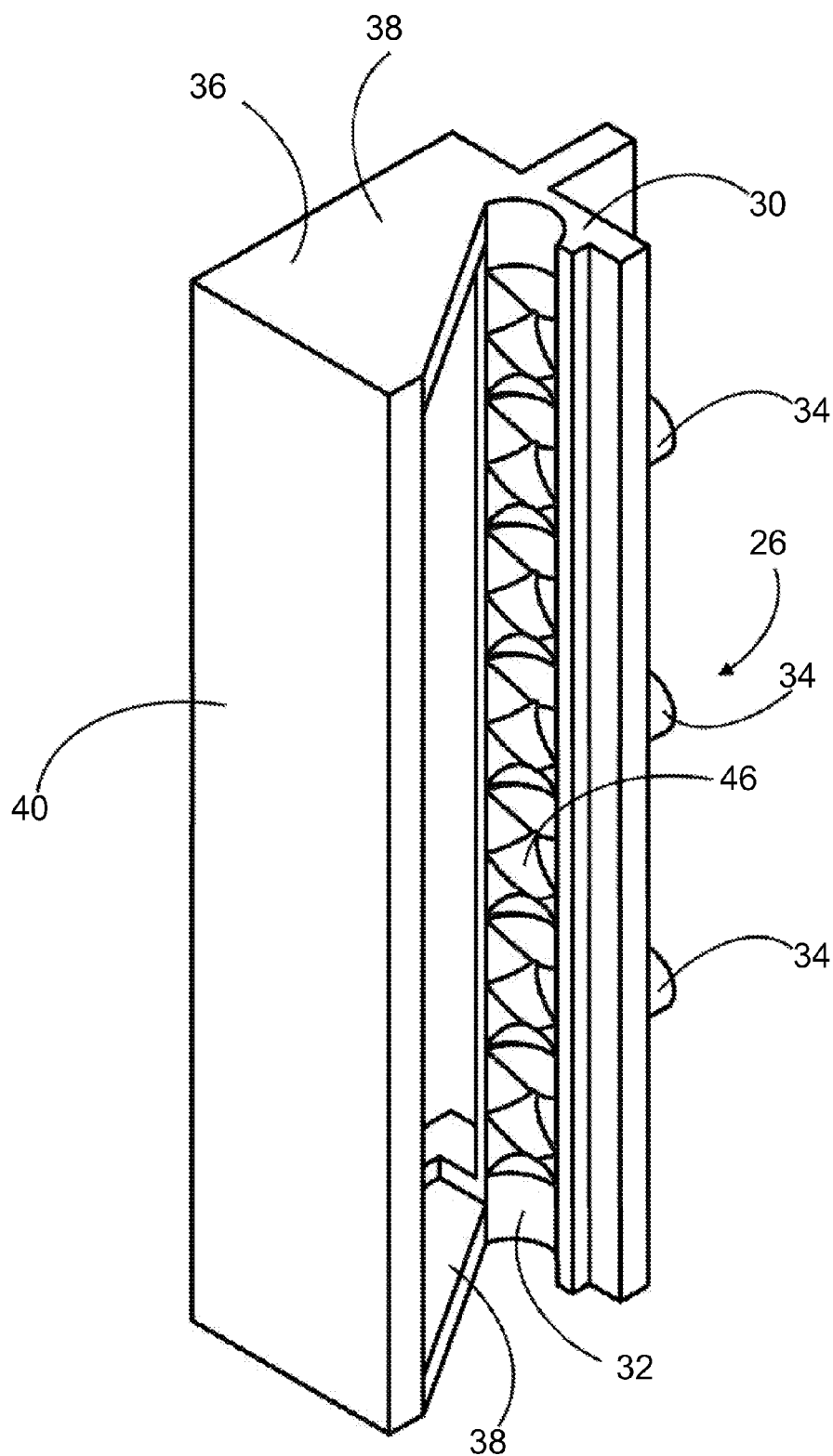
FIG. 5 is a perspective view of one embodiment of the fixed member of the securing mechanism for attaching the float to a fishing line.
Figure 6:
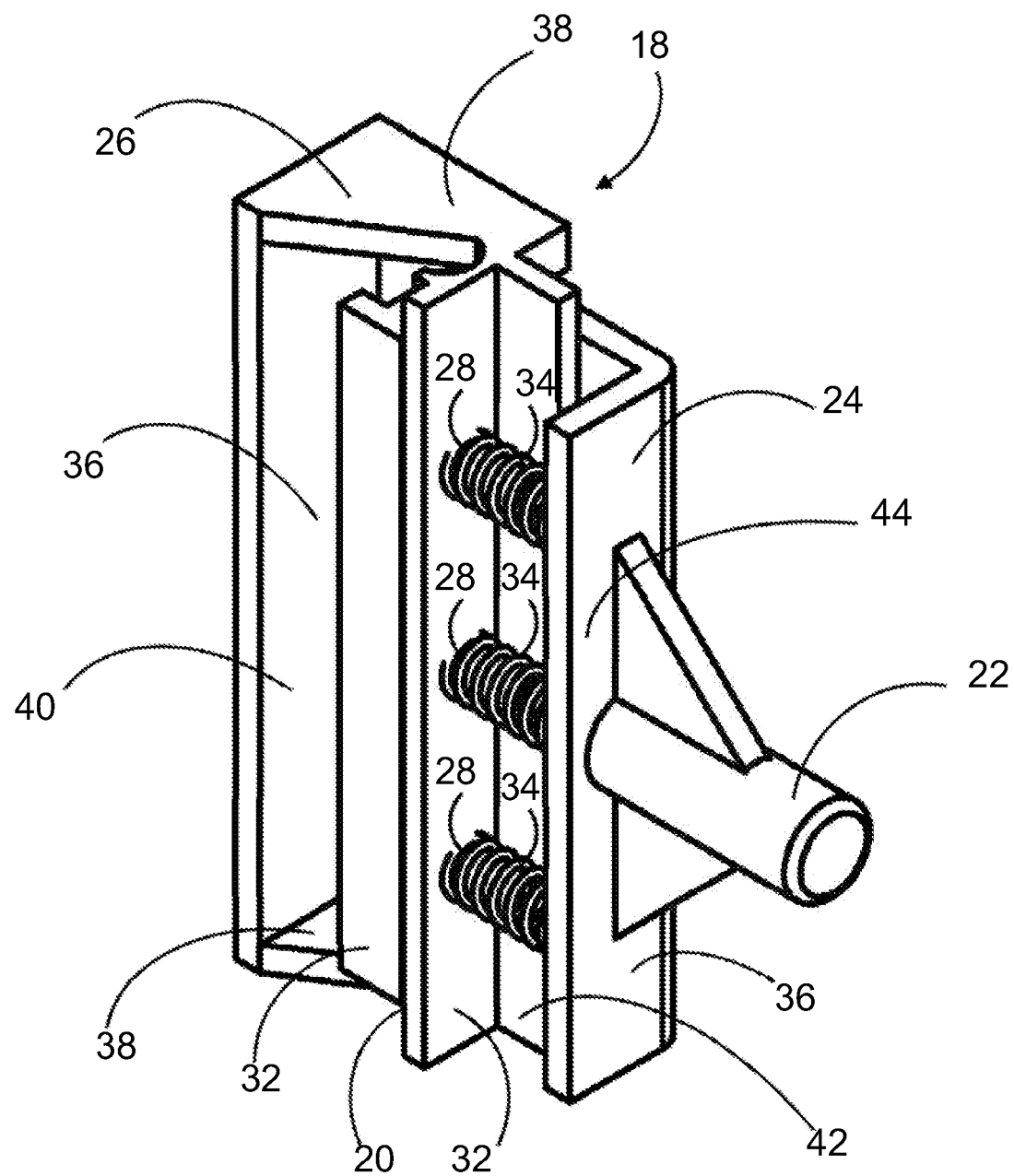
FIG. 6 is a perspective view of the securing mechanism, wherein the slidable member and the fixed member are disposed in interlocking relation, and wherein springs are in the operable position between the slidable member and the fixed member.
Figure 7:
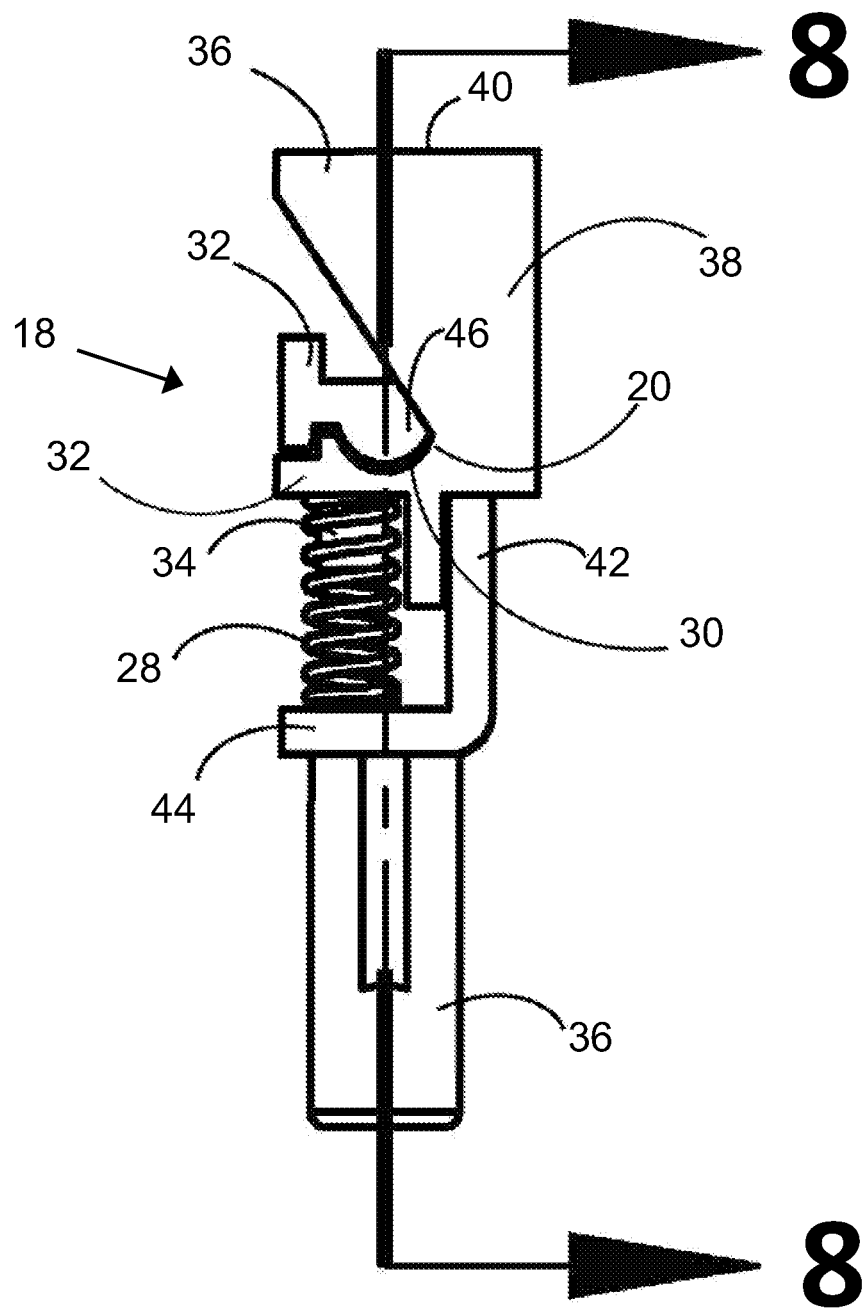
FIG. 7 is a side view of the securing mechanism, wherein the slidable member and the fixed member are disposed in interlocking relation, and wherein springs are in the operable position between the slidable member and the fixed member.
Figure 8:
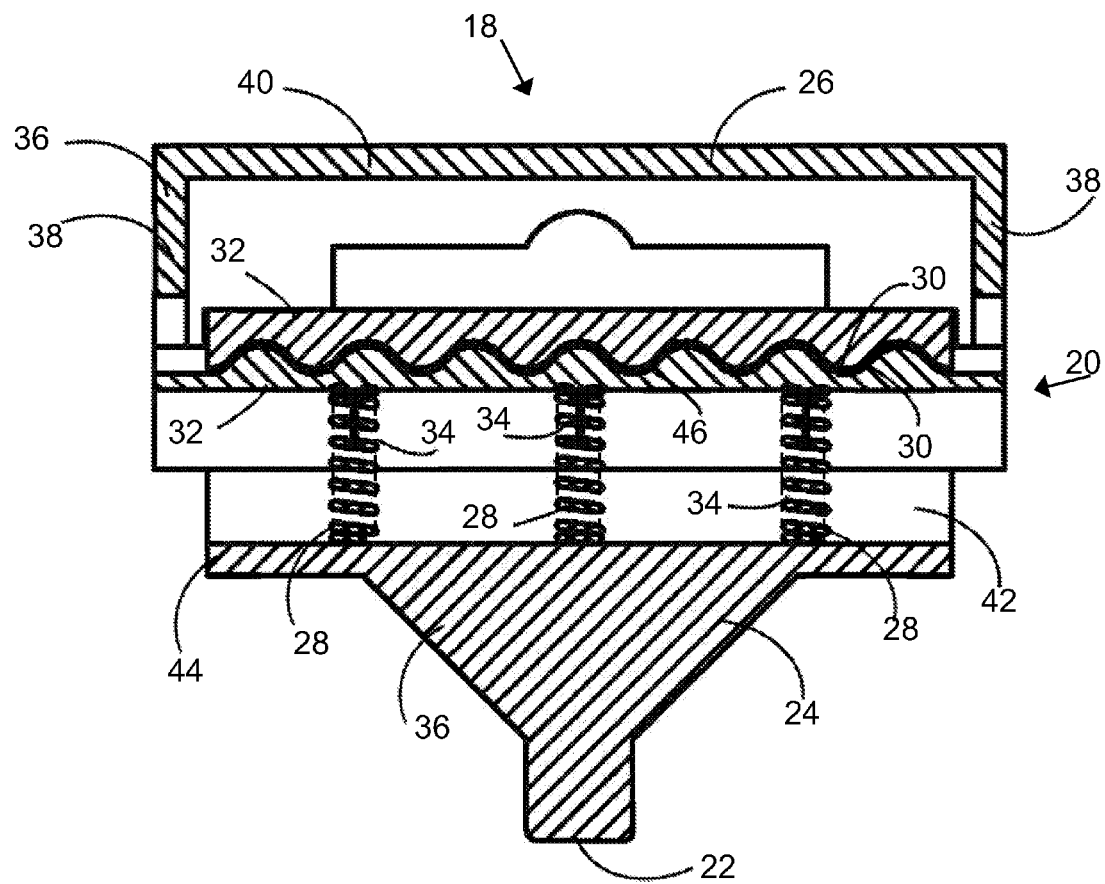
FIG. 8 is a front view of the securing mechanism, wherein the slidable member and the fixed member are disposed in interlocking relation, and wherein springs are in the operable position between the slidable member and the fixed member.

The securing mechanism 18 is shown in greater detail in FIGS. 4-8. In one preferred embodiment, the fixed member 26 includes a clamp member 32, having a clamp face 30 on one side thereof and a series of spring fingers 34 for receiving the springs 28 on an opposite side thereof. The clamp member 32 is attached to a frame 36, including a pair of side supports 38 and a longitudinal support 40. The slidable member 24 also includes a frame 36 having clamp member 32 with a clamp face 30 on an inner side thereof, wherein the clamp member 32 is attached to an elongated rear support 42 at a generally right angle. The rear support 42 is attached on an opposite side to a base member 44 at a generally right angle. The base member 44 includes a protruding button 22 on an outer portion thereof.

In operative position, the slidable member 24 and the fixed member 26 are positioned in an interlocking relation, as shown, wherein the clamp faces 30 of the slidable member 24 and fixed member 26 are facing one another, and may come into contact with one another in a closed position. In one embodiment, the clamp faces 30 have textured or shaped surfaces 46, in order to firmly grip the fishing line. Springs 28 are disposed about the spring fingers 34 of the fixed member 26, and come into contact with the slidable member 24 on an underside of the base member 44 (on an opposed side of the protruding button 22). The springs 28 tend to bias the clamp 20 into a closed position. Thus, when a user presses the button 22, the springs 28 are forced closed, and the clamp 20 is forced open to receive the fishing line therein.

It is contemplated that the housing 12 of the float 10 may be formed into any desired shape, but a spherical shape has been found particularly advantageous. The housing 12 may be made of plastic, and include a buoyant pocket of air or gas, or the housing 12 may be made from a solid piece of buoyant material, such as a low density wood or cork. The housing 12 preferably includes an inner cavity 48 that is shaped and adapted to receive the securing mechanism 18.

It is also contemplated that the float 10 may include compartments for receiving rattles or a light (not shown). Small marbles or BBs may be particularly suitable for rattles, and small lights (electrical or chemical) may be used for lighting purposes, as well. The purpose of the rattle is to attract fish, while the purpose of the light is twofold: 1) to attract fish, and 2) so that a fisherman can see the float at night. For the embodiment that includes the light, it is contemplated that the housing 12 of the float 10 may be made of transparent, translucent, or colored material that enhances the light.

Although the present invention has been described in considerable detail with reference to certain preferred versions thereof, other versions are possible. Therefore, the spirit and scope of the appended claims should not be limited to the description of the preferred versions contained herein. All features disclosed in this specification may be replaced by alternative features serving the same, equivalent or similar purpose, unless expressly stated otherwise. Thus, unless expressly stated otherwise, each feature disclosed is one example only of a generic series of equivalent or similar features.

What is claimed is:

1. A fishing float, said float comprising:
   a generally spherical shaped fixed housing having a hollow opening along a central vertical axis;
   a vertically oriented fixed slot disposed on a side of said housing and extending inwardly and terminating along said central vertical axis of said fixed housing, whereby said slot is capable of receiving a fishing line with attached hook;
   a securing mechanism positioned in a horizontally oriented cavity with respect to said vertically oriented fixed slot and disposed within said housing and in operative communication with said slot, wherein said slot is in operative communication with said securing mechanism to receive a fishing line;
   said securing mechanism comprising a fixed member that is fixed with respect to said spherical shaped housing and a sliding member that may be opened away from said fixed member in order to receive and releasably secure said fishing float to said fishing line;
   wherein said securing mechanism further includes a spring for biasing said sliding member in a closed position with respect to said fixed member and a protruding button that extends from said sliding member through a hole in said fixed housing.

2. The fishing float set forth in claim 1, wherein said fixed member and said sliding member may alternate between an open position and said closed position, wherein said fixed member and said sliding member are disposed in an interlocking relation.

3. The fishing float set forth in claim 1, wherein said slot includes a notch adjacent said central vertical axis of said generally spherical shaped fixed housing.

4. The fishing float set forth in claim 3, wherein said notch is disposed at a generally right angle from said slot.

* * * * *